(12) United States Patent
Shinbutsu et al.

(10) Patent No.: US 6,915,673 B2
(45) Date of Patent: Jul. 12, 2005

(54) METHOD OF ROLLING WORM GEAR AND THE WORM GEAR

(75) Inventors: Toshinaka Shinbutsu, Yamanashi (JP); Minoru Yoshizawa, Yamanashi (JP); Shuichi Amano, Yamanashi (JP); Kenji Ito, Yamanashi (JP)

(73) Assignee: Nissei Co., Ltd., Ohtsuki (JP)

( * ) Notice: Subject to any disclaimer, the term of this patent is extended or adjusted under 35 U.S.C. 154(b) by 107 days.

(21) Appl. No.: 10/333,921

(22) PCT Filed: Jun. 20, 2002

(86) PCT No.: PCT/JP02/06150
§ 371 (c)(1),
(2), (4) Date: Feb. 4, 2003

(87) PCT Pub. No.: WO03/000442
PCT Pub. Date: Jan. 3, 2003

(65) Prior Publication Data
US 2003/0167813 A1 Sep. 11, 2003

(30) Foreign Application Priority Data
Jun. 21, 2001 (JP) ........................................ 2001-187860

(51) Int. Cl.[7] .................................................. B21H 3/04
(52) U.S. Cl. ........................... 72/104; 72/11.1; 72/17.3; 72/108; 29/893.32
(58) Field of Search ................................ 72/11.1, 17.3, 72/102, 104, 108; 29/893.32; 74/425

(56) References Cited

U.S. PATENT DOCUMENTS

| | | | | |
|---|---|---|---|---|
| 3,580,029 A | * | 5/1971 | Daniel et al. .................. 72/108 |
| 3,631,703 A | * | 1/1972 | Bregi et al. .................... 72/108 |
| 3,729,967 A | * | 5/1973 | Bauknecht et al. ............ 72/102 |
| 3,777,345 A | * | 12/1973 | Brown .......................... 72/102 |
| 4,122,903 A | * | 10/1978 | Cole ............................. 172/781 |
| 5,953,957 A | * | 9/1999 | Ham et al. .................. 74/89.14 |
| 6,176,148 B1 | * | 1/2001 | Zhang et al. .................. 74/425 |
| 6,247,376 B1 | * | 6/2001 | Zhou et al. .................... 74/425 |
| 6,418,767 B2 | * | 7/2002 | Shinbutsu et al. ............ 72/10.2 |
| 2001/0039820 A1 | | 11/2001 | Shinbutsu et al. | |

FOREIGN PATENT DOCUMENTS

| | | |
|---|---|---|
| EP | 0 947 258 A2 | 10/1999 |
| JP | 3-110035 | 5/1991 |
| JP | 4-89151 | 3/1992 |
| JP | 9-24855 | 1/1997 |
| JP | 11-285766 | 10/1999 |
| JP | 2001-225138 | 8/2001 |

\* cited by examiner

*Primary Examiner*—Ed Tolan
(74) *Attorney, Agent, or Firm*—Westerman, Hattori, Daniels & Adrian, LLP

(57) ABSTRACT

A worm is formed by rolling to reduce the number of processing steps while ensuring the worm accuracy satisfactorily. A work material is positioned between a first rolling die (100) and a second rolling die (101) by rotation of the rolling dies and a servomotor (76) for feeding the work material. When the lead angle of a worm is large and there is a large difference between the finished diameter and the blank diameter, the lead angle changes during the progress of rolling process, resulting in occurrence of through-feed. A slide plate (55) is freely slidable on a slide (53). Therefore, when through-feed occurs owing to the lead angles of the first and second rolling dies (100) and (101) and the workpiece, the slide plate (55) slides freely, and this is detected with a detecting sensor. The rotation of the first and second rolling dies (100) and (101) is stopped. Then, the first and second rolling dies (100) and (101) initiate reverse rotation, and at the same time, the slide plate (55) also initiates movement in the reverse direction. Thus, rolling is started. Thereafter, similar processing is repeated to perform rolling.

10 Claims, 12 Drawing Sheets

(a)

METHOD OF ROLLING WORM GEAR AND THE WORM GEAR

TECHNICAL FIELD

The present invention relates to a method of forming a worm by rolling and also relates to a worm formed by the rolling method. More particularly, the present invention relates to a worm rolling method for forming a worm for driving a steering wheel of an automobile or the like by rolling. The present invention also relates to a worm formed by the rolling method.

BACKGROUND ART

There is known a type of electric power steering system for a vehicle in which the rotational output of an electric motor is reduced in speed through a worm gear mechanism to assist in driving an output shaft connected to a steering wheel. In a known type of power steering system for light cars to which no heavy load is applied, a combination of a metallic cylindrical worm and a worm wheel made of a resin is used as a worm gear mechanism [for example, Japanese Patent Application Unexamined Publication (KOKAI) No. Hei 9–24855].

Because it requires accuracy, the metallic worm is produced by turning quench-hardened steel in a lathe, followed by heat treatment and finish grinding. When turned in a lathe, the workpiece is cut with a cutting tool. However, when it is desired to increase productivity, a conical milling cutter is used, and the workpiece is cut in a thread cutting manner with the axis of the milling cutter inclined with respect to the worm axis by γ (the lead angle at the pitch line of the worm).

However, the above-described worm manufacturing process needs roughly at least three steps, i.e. cutting, heat treatment, and grinding. Regarding equipment therefor, also, at least three apparatuses are required, i.e. a lathe, heat-treatment equipment, and a grinding machine. For this reason, the processing cost increases, and the advantage of the resin worm wheel cannot satisfactorily be exhibited.

Meanwhile, when an external thread, a worm or the like is formed by rolling, a first rolling die and a second rolling die, which are disposed facing each other, are fed toward each other to penetrate the work material. At this time, when the lead angle of the worm is large and there is a large difference between the finished diameter and the blank diameter, the workpiece may undesirably travel during the progress of rolling process, causing a change in the lead angle. Such a phenomenon is known as "through-feed". If through-feed occurs, the condition of contact of the cylindrical dies becomes different between the flank of thread in the direction of travel of the workpiece due to the through-feed and the opposite flank, resulting in degradation of the finished accuracy of the rolled surface. To prevent the occurrence of through-feed, the conventional practice is to make correction by changing the phase position in the axial direction of the first or second rolling die on the basis of visual observation or the like.

However, this correction method for preventing through-feed is difficult to carry out for a component part in which there is a shaft on each side of an external thread or a worm, the shaft having a larger diameter than that of the external thread or the worm, because the rolling die may interfere with the shaft. In such a case, the dies may be rotated in the forward or reverse direction to perform rolling. With this method, however, high product accuracy cannot be obtained owing to the occurrence of backlash or the like, and productivity is inferior. The present applicant proposed a spindle tilting mechanism that causes the first and second rolling dies to pivot about an axis perpendicular to the axes of rotation of the dies to prevent the occurrence of through-feed [Japanese Patent Application Unexamined Publication (KOKAI) No. Hei 11-285766].

However, even if the spindle tilting mechanism is used, the occurrence of through-feed cannot completely be prevented in the case of a workpiece for a worm or the like that has a large change in diameter during the rolling process from the initiation to the termination of the process, resulting in occurrence of a working error.

An object of the present invention is to provide a method of forming a worm by rolling that allows a reduction in the number of processing steps while ensuring the worm accuracy satisfactorily, and also provide a worm formed by the rolling method.

Another object of the present invention is to provide a method of forming a worm by rolling that allows a reduction in costs while ensuring the worm accuracy satisfactorily, and also provide a worm formed by the rolling method.

The advantages of the present invention are as follows. The present invention allows an axially shifted, thin-toothed worm to be formed with high accuracy by rolling. Accordingly, the number of processing steps required can be reduced in comparison to the conventional worms. Moreover, the processing cost can be reduced to a considerable extent.

DISCLOSURE OF THE INVENTION

To attain the above-described objects, the present invention adopts the following means.

A worm rolling method according to the present invention is carried out by using a rolling machine. The rolling machine has a plurality of cylindrical dies for rolling a cylindrical blank placed in the center between the dies; die rotationally driving means for rotationally driving the dies; blank supporting means for rotatably supporting the blank; and penetrate feed means for penetrate-feeding the dies toward each other. In the worm rolling method, a worm is formed by rolling by alternately repeating a first step of rolling the blank by penetrate-feeding the dies toward the blank while synchronously rotating the dies in the same direction and a second step of rolling the blank with the dies by reversing the direction of rotation of the dies after termination of the first step.

In the above-described worm rolling method, if the second step is carried out after the dies have been withdrawn in the opposite directions to the penetrate feed directions, rolling of higher accuracy can be performed continuously. To improve the roundness of the worm, the worm should preferably be formed by alternately carrying out the first step and the second step in a state where the penetrate feed of the dies is suspended.

If the dies of the rolling machine comprise two dies disposed approximately in the center between four guides such that the axes of rotation of the dies are parallel to each other, even more effective rolling can be performed.

Preferably, in the worm rolling method, the occurrence of through-feed, which is axial travel of the worm due to a change in the lead angle of the worm caused by a change in the diameter of the blank during the rolling, is detected from the travel of the blank, and when the travel has exceeded a set range, the direction of rotation of the dies is reversed to reverse the direction of the through-feed.

Preferably, in the worm rolling method, the rolling machine has spindle tilting means for pivoting the dies about an axis perpendicular to the axes of rotation of the dies. Through-feed, which is axial travel of the blank due to a change in the lead angle caused by a change in the diameter of the blank during the rolling, is detected, and a correction pivot angle of the spindle tilting means is computed to cancel the through-feed. Then, the dies are pivoted by the spindle tilting means by an amount corresponding to the correction pivot angle to cancel the through-feed.

A worm according to the present invention is formed by a worm rolling method using a rolling machine. The rolling machine has a plurality of cylindrical dies for rolling a cylindrical blank placed in the center between the dies; die rotationally driving means for rotationally driving the dies synchronously with each other; blank supporting means for rotatably supporting the blank; and penetrate feed means for penetrate-feeding the dies toward each other. The bottom between the teeth of the worm has a vertex as viewed in a section containing the axis of the worm. Preferably, the vertex has an angle of 120 to 150 degrees in the case of carbon steel for mechanical structure, and the tip of the vertex has an arcuate configuration with a radius of 1.0 to 1.5 mm as viewed in a section.

Another worm according to the present invention is formed by a worm rolling method using a rolling machine. The rolling machine has a plurality of cylindrical dies for rolling a cylindrical blank placed in the center between the dies; die rotationally driving means for rotationally driving the dies synchronously with each other; blank supporting means for rotatably supporting the blank; and penetrate feed means for penetrate-feeding the dies toward each other. The bottom between the teeth of the worm has an arcuate configuration as viewed in a section containing the axis of the worm. Preferably, the arcuate configuration has a radius of 1.0 to 1.5 mm as viewed in a section in the case of carbon steel for mechanical structure.

Preferably, the dies of the rolling machine used to roll the worm according to the present invention comprise two dies disposed approximately in the center between four guides such that the axes of rotation of the dies are parallel to each other.

Further, the rolling machine used to roll the worm according to the present invention preferably has spindle tilting means for pivoting the dies about an axis perpendicular to the axes of rotation of the dies. Preferably, the tooth thickness of the worm is smaller than the tooth space thereof as viewed in a section containing the axis of the worm.

BEST MODE FOR CARRYING OUT THE INVENTION

Figure 1:
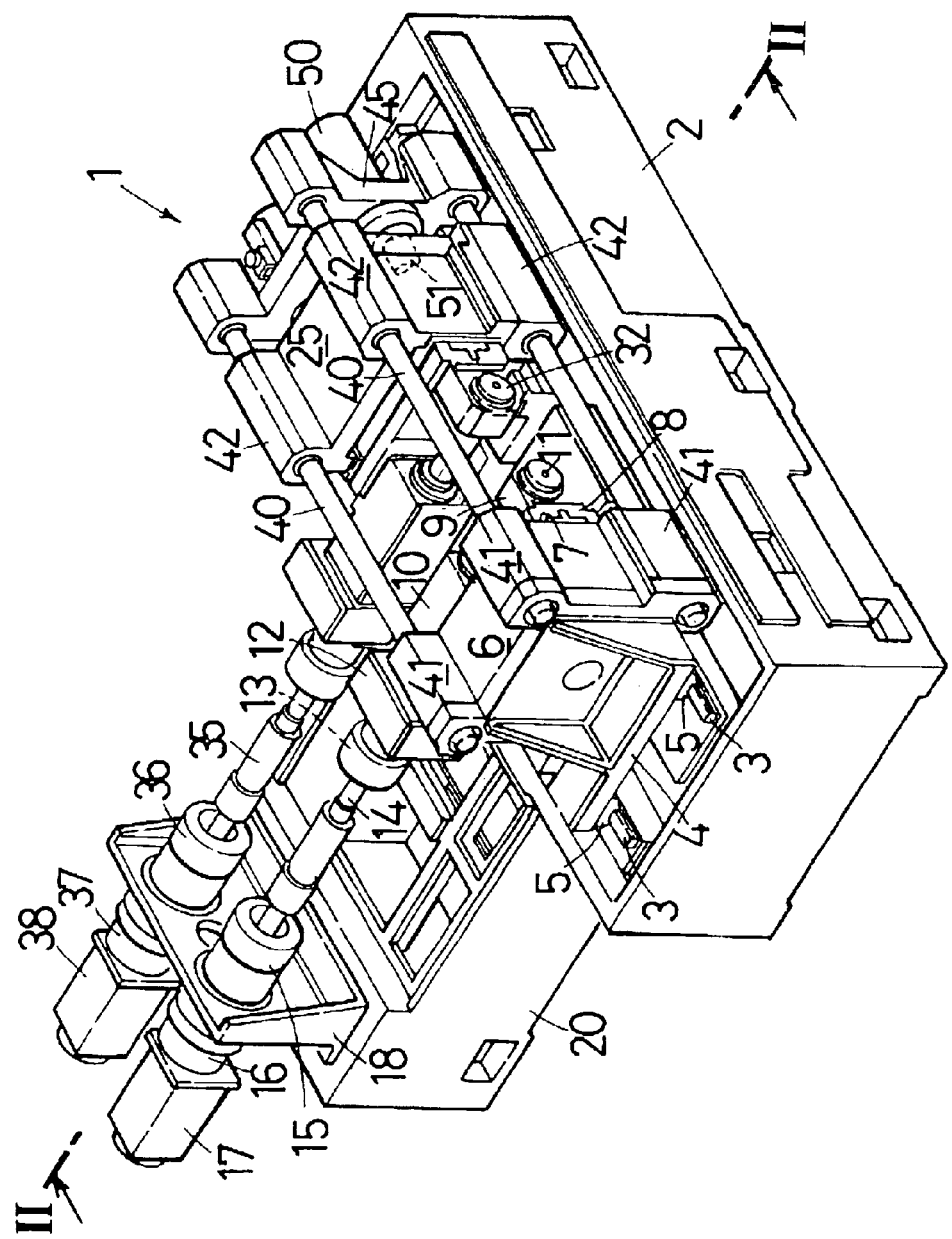
FIG. 1 is a three-dimensional external view showing the whole of a rolling machine for rolling a worm according to the present invention.
Figure 2:
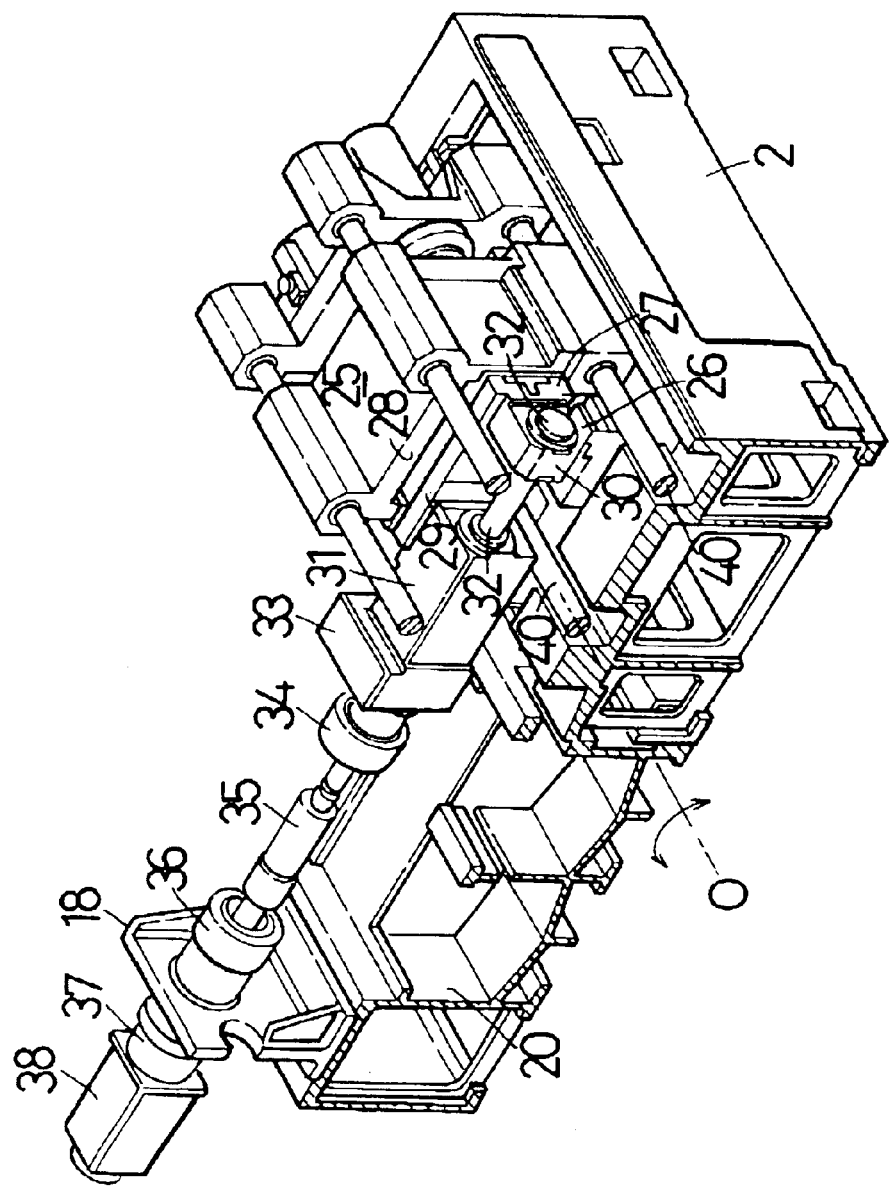
FIG. 2 is a partly-sectioned view of the rolling machine as taken along the line II—II in FIG. 1.
Figure 3:
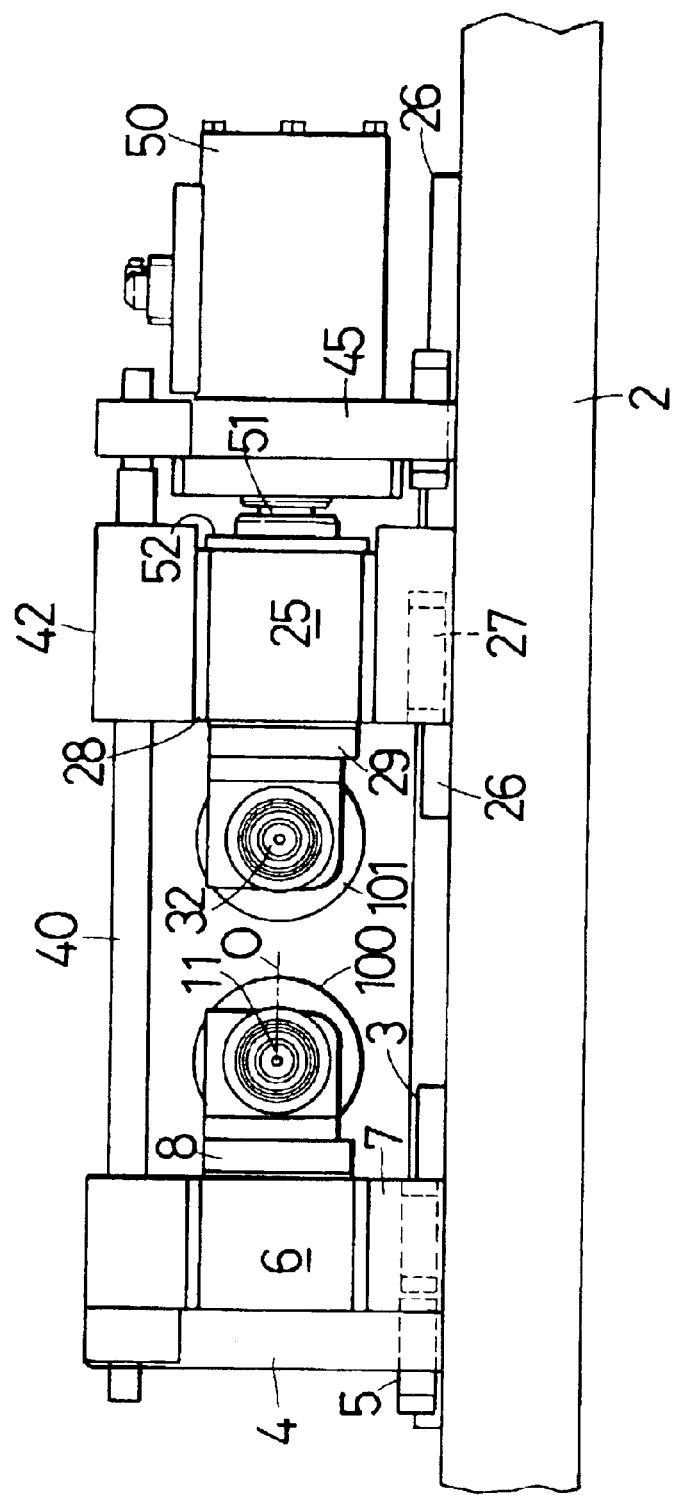
FIG. 3 is a front view of the rolling machine.
Figure 4:
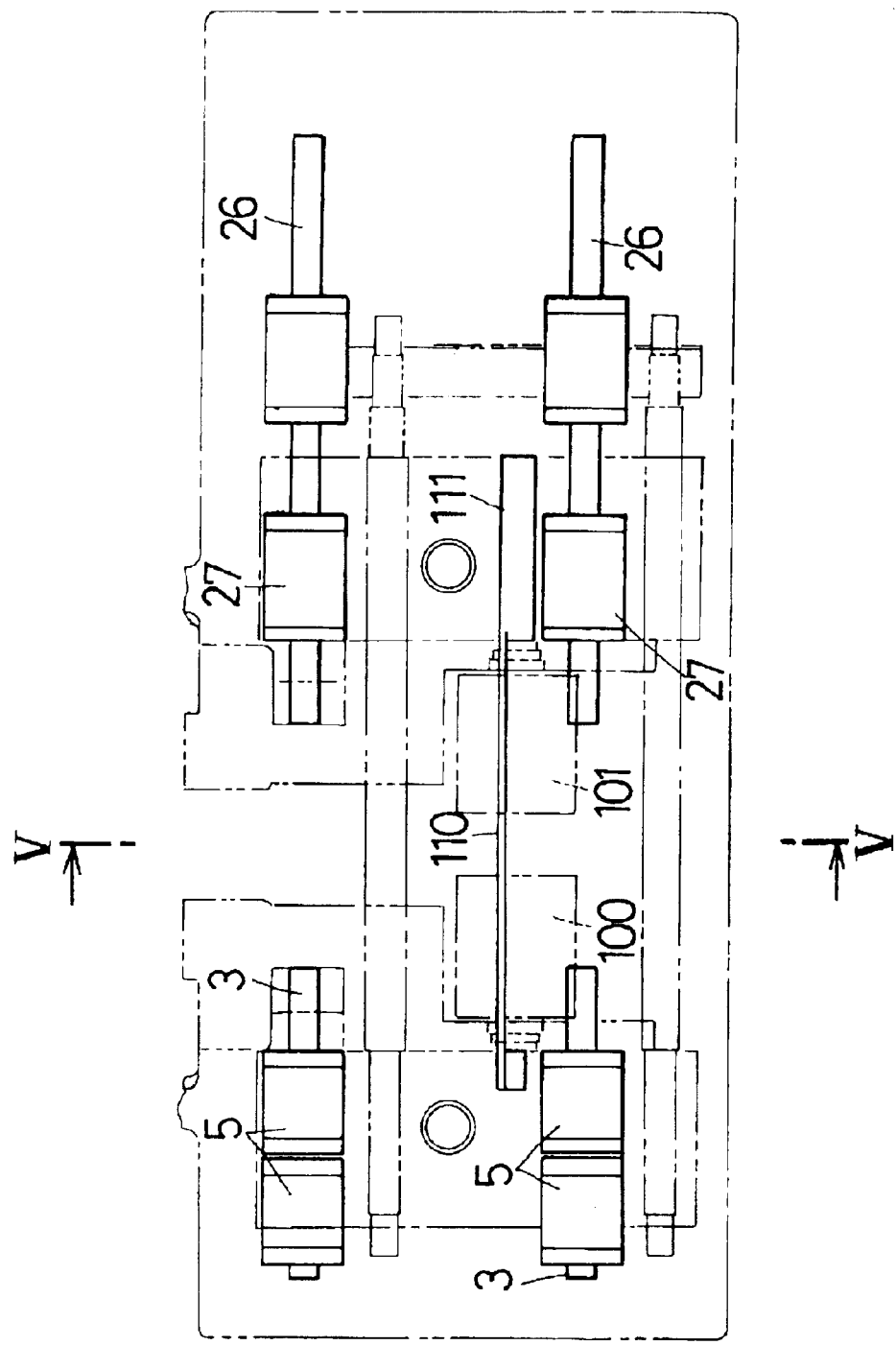
FIG. 4 is a plan view of the rolling machine.

Embodiments of the present invention will be described below. FIG. 1 is a three-dimensional external view showing the whole of a rolling machine for forming a worm according to the present invention. FIG. 2 is a partly-sectioned view of the rolling machine as taken along the line II—II in FIG. 1. FIG. 3 is a front view of the rolling machine. FIG. 4 is a sectional plan view. The rolling machine 1 is a cylindrical-die rolling machine for plastically working a blank by plastically deforming it with cylindrical dies disposed facing each other. In the conventional cylindrical-die rolling machine, a moving die driven to rotate and a stationary die that is free running with the moving die are disposed facing each other so that the axes of rotation of the dies are parallel to each other. A blank is placed in the middle between the dies.

The rolling machine 1 for forming a worm according to the present invention drives two cylindrical dies to rotate in the same direction simultaneously and synchronously with each other during rolling. The detailed structure therefor will be described below. A bed 2 is a structure with a hollow inside that constitutes the body of the rolling machine 1 (see FIG. 2). The bed 2 is roughly in the shape of a box, which is produced by casting or welding steel plates. Two parallel first guide rails 3 are secured to the top of the bed 2 with bolts or the like. A first die moving and supporting plate 4 is movably mounted through linear bearing blocks 5 on the two first guide rails 3. A first die moving plate 6 is integrally secured to the front of the first die moving and supporting plate 4. The first die moving plate 6 is also movably provided through linear bearing blocks 5 on the two first guide rails 3.

A first cylindrical die supporting plate 8 is supported on the front 7 of the first die moving plate 6 in such a manner as to be pivotable for the reason stated later (see FIG. 3). The first cylindrical die supporting plate 8 has two bearings, i.e. a first cylindrical die bearing 9 and a second cylindrical die bearing 10, provided thereon at a distance therebetween. A first cylindrical die shaft 11 is horizontally disposed between the first cylindrical die bearing 9 and the second cylindrical die bearing 10. The first and second cylindrical die bearings 9 and 10 support both ends of the first cylindrical die shaft 11.

The first cylindrical die supporting plate 8 is pivotable about a pivot axis perpendicular to the center axis of the first cylindrical die shaft 11 through a first spindle tilting mechanism (not shown). The first spindle tilting mechanism comprises a gear disposed on a side of the first die moving plate 6 and a servomotor that meshes with the gear. The servomotor 142 for pivotably driving the first cylindrical die supporting plate 8 controls the pivot angle position of the first cylindrical die supporting plate 8 under the control of a CNC system 120 (see FIG. 9), which will be described later. The first spindle tilting mechanism prevents the occurrence of a working error due to a through-feed phenomenon that may occur during working of a component part having a helical configuration such as a screw or a worm (described later).

A gear box 12 is disposed at an end of the second cylindrical die bearing 10. The gear box 12 contains a detector 134 (see FIG. 9). A gear mechanism in the gear box 12 transmits rotation from a driving shaft 14 to the first cylindrical die shaft 11 through a universal joint 13. The driving shaft 14 is further connected to an output shaft (not shown) of a speed reduction mechanism 16 through a universal joint 15. The speed reduction mechanism 16 is fixedly supported by a bracket 18.

The bracket 18 is mounted on a driving mechanism supporting plate 20. The driving mechanism supporting plate 20 is secured adjacent to the center of a side of the bed 2 integrally with the bed 2. The output shaft of a servomotor 17 is connected to the input shaft (not shown) of the speed reduction mechanism 16. Consequently, the rotational output of the servomotor 17 is reduced in speed through the speed reduction mechanism 16 and transmitted through the universal joint 15, the driving shaft 14, the universal joint 13 and the gear mechanism in the gear box 12 to rotationally drive the first cylindrical die shaft 11 according to a rotational speed command. The rotational output of the servomotor 17 is controlled by the CNC system 120 (described later).

To transmit the rotational drive of the servomotor 17 to the first cylindrical die shaft 11, a rotational drive transmitting mechanism comprising two universal joints 15 and 13 is adopted. The servomotor 17 is secured to the driving mechanism supporting plate 20, whereas the first cylindrical die shaft 11 is not fixed in position because the first die moving plate 6 is movable along the two first guide rails 3. Therefore, the rotation cannot smoothly be transmitted to the first cylindrical die shaft 11 through a conventional joint structure. The rotational drive transmitting mechanism using the universal joints 13 and 15 performs the function of transmitting the rotation of the servomotor 17 to the first cylindrical die shaft 11 smoothly and at uniform speed.

On the other hand, a second die moving plate 25 is disposed at a position on the bed 2 that faces the first die moving plate 6. Two second guide rails 26 are secured to the top of the bed 2 with bolts or the like. The second guide rails 26 are disposed at respective positions on the straight prolongation of the two first guide rails 3 for guiding the first die moving plate 6 (see FIG. 4). The second die moving plate 25 is movably mounted through linear bearing blocks 27 on the two second guide rails 26 (see FIG. 3).

Figure 5:
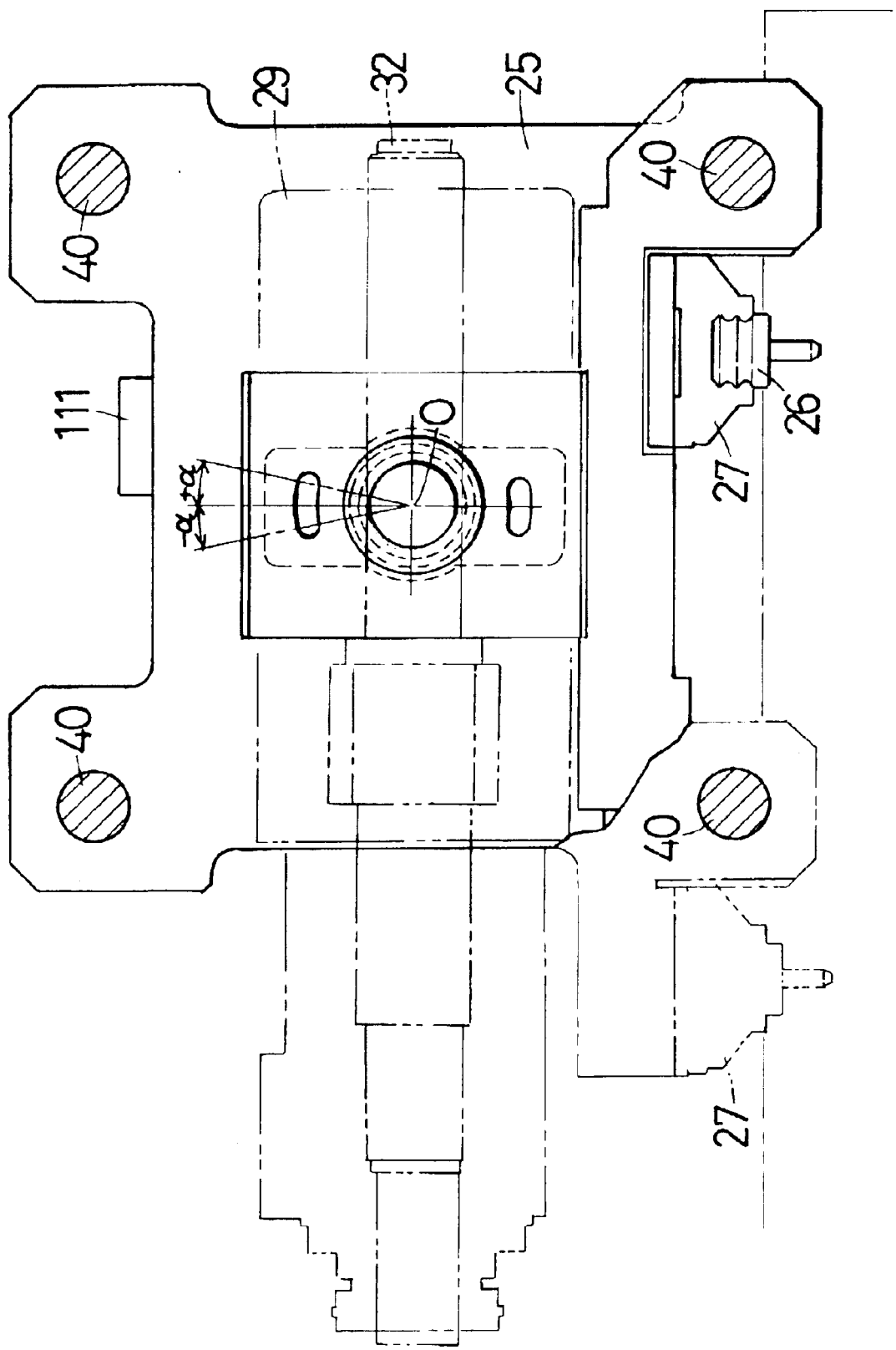
FIG. 5 is a left-hand side view of a second die moving plate.

A second cylindrical die supporting plate 29 is supported on the front 28 of the second die moving plate 25 in such a manner as to be pivotable about the center O for the reason stated later (see FIG. 5). The second cylindrical die supporting plate 29 has two bearings, i.e. a third cylindrical die bearing 30 and a fourth cylindrical die bearing 31, provided thereon at a distance therebetween (see FIG. 2). A second cylindrical die shaft 32 is horizontally disposed between the third cylindrical die bearing 30 and the fourth cylindrical die bearing 31. The third and fourth cylindrical die bearings 30 and 31 rotatably support both ends of the second cylindrical die shaft 32.

The second cylindrical die supporting plate 29 is pivotable about the pivot axis O perpendicular to the center axis of the second cylindrical die shaft 32 by an angle +α or −α (see FIG. 5) through a second spindle tilting mechanism (not shown). The second spindle tilting mechanism comprises a gear disposed on a side of the second die moving plate 25 and a servomotor that meshes with the gear. The servomotor 147 for driving the second cylindrical die supporting plate 29 controls the position of the second cylindrical die supporting plate 29 under the control of the CNC system 120 (see FIG. 9), which will be described later. The second spindle tilting mechanism prevents the occurrence of an error due to a through-feed phenomenon that may exert an influence upon the configuration accuracy of a component part having a helical structure such as a screw or a worm (described later).

A gear box 33 is disposed at an end of the fourth cylindrical die bearing 31. The gear box 33 contains a rotation detecting mechanism (not shown). A gear mechanism in the gear box 33 transmits rotation from a driving shaft 35 to the second cylindrical die shaft 32 through a universal joint 34. The driving shaft 35 is further connected to an output shaft (not shown) of a speed reduction mechanism 37 through a universal joint 36. The speed reduction mechanism 37 is fixedly supported by the above-described bracket 18.

The output shaft of a servomotor 38 is connected to the input shaft of the speed reduction mechanism 37. Consequently, the rotational output of the servomotor 38 is reduced in speed through the speed reduction mechanism 37 and transmitted through the universal joint 36, the driving shaft 35, the universal joint 34 and the gear mechanism in the gear box 33 to control the second cylindrical die shaft 32 according to a command from the CNC system 120 (see FIG. 9).

The first die moving and supporting plate 4 and the first die moving plate 6 have shaft securing portions 41 provided in the four corners of the outer periphery thereof. One end of each of four connecting shafts 40 is secured to one of the shaft securing portions 41. The four connecting shafts 40 are disposed parallel to each other and also parallel to the first guide rails 3 and the second guide rails 26. The second die moving plate 25 has guide portions 42 provided in the four corners of the outer periphery thereof. The second die moving plate 25 is movably supported by the four connecting shafts 40 through bearings incorporated in the guide portions 42.

[Die Feed Apparatus 49]

Figure 6:
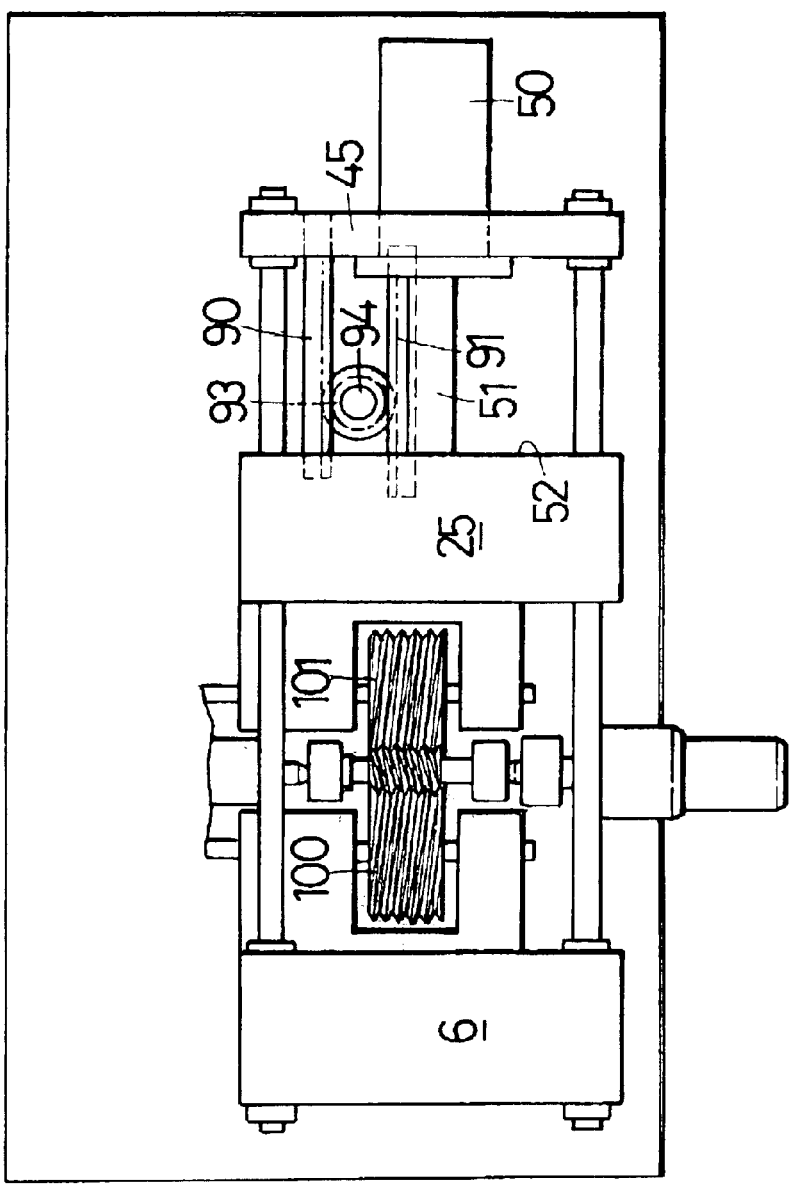
FIG. 6 is a plan view of the rolling machine, schematically showing the mechanism of a die feed apparatus.

FIG. 6 is a schematic plan view of the rolling machine, schematically showing the mechanism of the die feed apparatus. As will be understood from the foregoing description, the second die moving plate 25 is movable relative to the first die moving plate 6 toward or away from it by being guided by the second guide rails 26 and the four connecting shafts 40. The other ends of the connecting shafts 40 are connected and secured to a pressure plate 45. A hydraulic cylinder 50 comprising a hydraulic cylinder device is secured to the pressure plate 45. The hydraulic cylinder 50 has a servovalve capable of controlling the extension position of the piston with high accuracy. The hydraulic cylinder 50 has a piston rod 51 as an output shaft. The distal end of the piston rod 51 is secured to the back 52 of the second die moving plate 25.

When the hydraulic cylinder 50 is driven by introducing a hydraulic pressure thereinto, the piston rod 51 extends. Because the hydraulic cylinder 50 is secured to the pressure plate 45 and the pressure plate 45 is connected to the first die moving plate 6 through the connecting shafts 40, the first die moving plate 6 and the second die moving plate 25 approach each other as the piston rod 51 extends.

As shown in FIG. 6, a rack 91 is disposed to face in the same direction as the direction of movement of the second die moving plate 25. One end of the rack 91 is secured to the second die moving plate 25. One end of a rack 90 is secured to the pressure plate 45. The racks 90 and 91 are disposed parallel to each other.

The racks 90 and 91 are in mesh with a pinion 93. A pinion shaft 94 of the pinion 93 is rotatably provided on the bed 2. Consequently, when the hydraulic cylinder 50 is driven, the piston rod 51 extends. Because the hydraulic cylinder 50 is secured to the pressure plate 45 and the pressure plate 45 is connected to the first die moving plate 6 through the connecting shafts 40, the first die moving plate 6 and the second die moving plate 25 come toward or away from each other according to the extension of the piston rod 51.

At this time, the pinion shaft 94 does not move although it rotates because the pinion shaft 94 is rotatably supported on the bed 2. Consequently, the center position of the space between the first die moving plate 6 and the second die moving plate 25 is always located at a fixed position on the bed 2. If the center axis of the workpiece (object that is being manufactured) is set coincident with the fixed position, the working accuracy of the workpiece increases, and it also becomes easy to feed the workpiece to the rolling machine 1 and to remove it therefrom.

The space between the first die moving plate 6 and the second die moving plate 25 is measured by a moving plate space measuring means (described later) disposed on the second die moving plate 25. The moving plate space measuring means comprises a linear scale 111 secured to the top of the second die moving plate 25, a sensor (not shown) for reading magnetic graduations on the linear scale 111, a bar-shaped sensor plate 110 having the sensor secured thereto, and so forth (see FIG. 4).

One end of the sensor plate 110 is secured to the first die moving plate 6. Accordingly, when the first die moving plate 6 and the second die moving plate 25 move relative to each other, the sensor reads the magnetic graduations on the linear scale 111. Thus, it is possible to read the distance between the first die moving plate 6 and the second die moving plate 25. The rotational drive of the first and second cylindrical die shafts 11 and 32 in the rolling machine 1 and the movement of each rolling die are controlled synchronously or asynchronously by the CNC system 120 (described later).

[Work Feed Apparatus 59]

Figure 7:
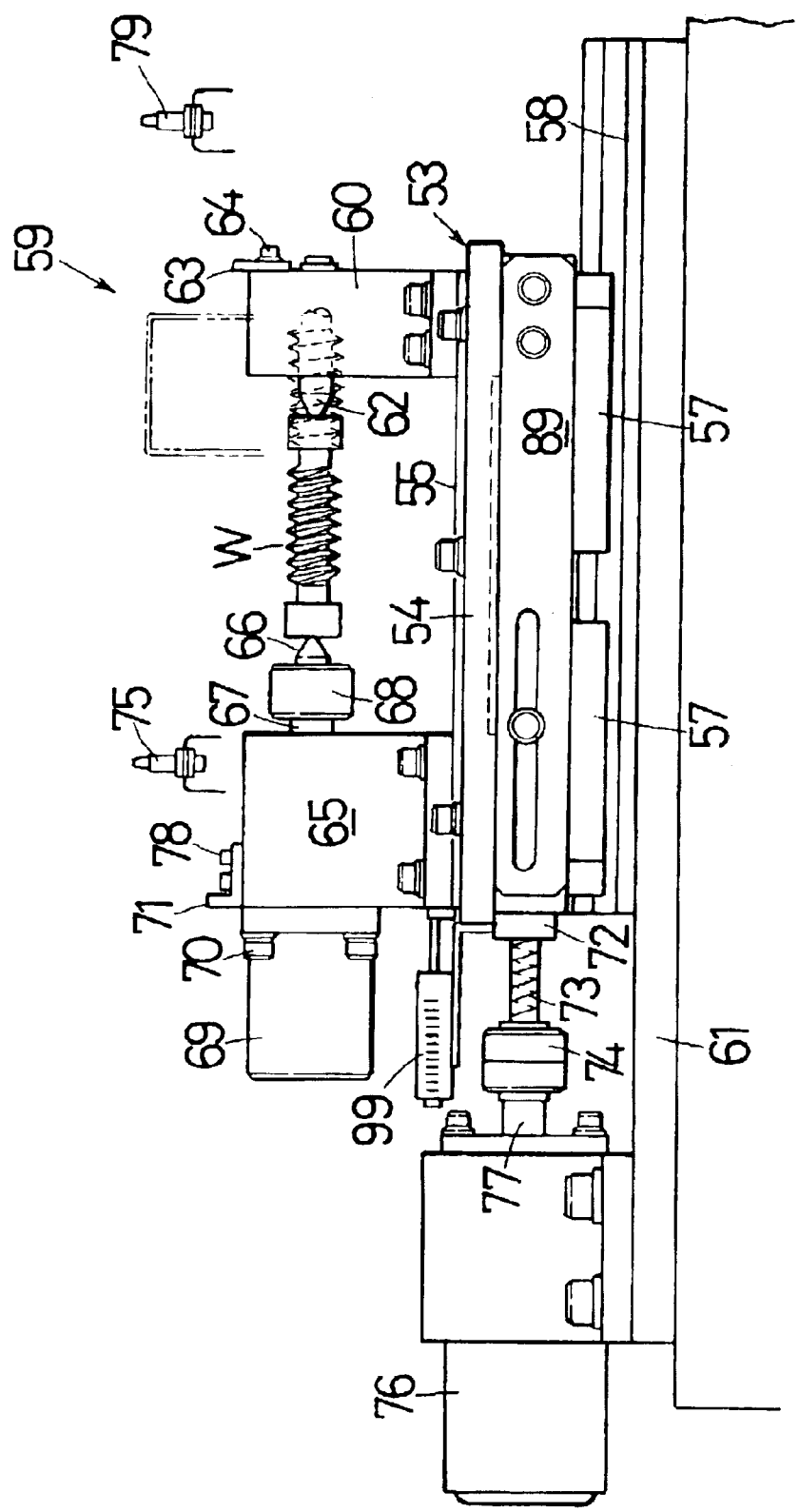
FIG. 7 is a side view of a work feed apparatus for supporting and feeding a workpiece, which is an object that is being manufactured.

FIG. 7 is a side view of a work feed apparatus 59 for supporting and feeding a workpiece W, which is an object that is being manufactured. A first rolling die 100 and a second rolling die 101 are keyed on the above-described first and second cylindrical die shafts 11 and 32, respectively. A single linear rail 58 is secured to the top of a base plate 61 with bolts. Two linear blocks 57 are movably mounted on the linear rail 58.

Work length adjusting plates 89 are stretched between both sides of the two linear blocks 57 and fixedly connected to each other with bolts. Further, a slide retainer 54 is secured to the top of each work length adjusting plate 89 with bolts. A slide plate 55 is slidably provided between the two slide retainers 54. The slide plate 55, which is guided by the slide retainers 54, moves during the rolling process. The slide plate 55 is movable only within a set range.

Thus, a slide 53 is formed from the linear blocks 57, the work length adjusting plates 89, the slide retainers 54 and the slide plate 55. A tailstock 60 is secured to the top of the slide plate 55. A center 62 for rotatably supporting a worm blank or a workpiece W is inserted into and secured to the tailstock 60. A sensor dog 63 for determining the movable range of the slide plate 55 is secured to the tailstock 60 with bolts 64. An advanced position detecting sensor 79 for sensing the movement of the sensor dog 63 is secured to the base plate 61.

A chuck plate 65 is secured to the slide plate 55 so as to face the tailstock 60. The chuck plate 65 is provided with a center supporting shaft 67. A live center 66 is rotatably supported by the center supporting shaft 67 through a bearing 68. On the other hand, a pneumatic chucking cylinder 69 for axially movably driving the center supporting shaft 67 is secured to the back of the chuck plate 65 with bolts 70. The pneumatic chucking cylinder 69 has a piston rod that is actuated by pneumatic pressure. The piston rod is connected to the center supporting shaft 67.

Accordingly, when the pneumatic chucking cylinder 69 is activated, the center supporting shaft 67 and the live center 66 are driven to extend or contract in the axial direction, thereby allowing the blank or the workpiece W to be loaded between the live center 66 and the center 62 or unloaded therefrom. A nut 72 is secured to the linear block 57. The nut 72 has a feed screw 73 screwed therein. One end of the feed screw 73 is connected to an output shaft 77 of a servomotor 76 through a coupling 74, which is a rotary joint.

Accordingly, when the servomotor 76 is driven, the feed screw 73 is driven to rotate, causing the slide 53 to move along the linear rail 58. Thus, the position of the slide 53 is controlled. A sensor dog 71 is secured to the top of the chuck plate 65 with bolts 78. A retracted position detecting sensor 75 for sensing the movement of the sensor dog 71 is secured to the base plate 61. Accordingly, the advanced position detecting sensor 79 detects the advanced position of the workpiece W, whereas the retracted position detecting sensor 75 detects the retracted position of the workpiece W.

A linear scale 99 is secured to a side of the chuck plate 65. The linear scale 99 is a magnetic scale. The movement of the linear scale 99 is read and sensed by a fixed reader (not shown). Accordingly, the movement of the workpiece W is detected by sensing the movement of the linear scale 99.

As the rolling process progresses, the lead angle of the workpiece W, which is a worm, changes, resulting in an error, as has been stated above. If this error does not occur, the workpiece W will not move in the axial direction in theory, as will be described later. The error appears as an amount of through-feed by which the workpiece travels in the axial direction. The movement of linear scale 99 is read by the sensor, and the read data is computed as an amount of through-feed by a through-feed detecting program 160 (see FIG. 9).

That is, when a helical groove is to be formed on the workpiece W by rolling, the first and second rolling dies 100 and 101 are fed toward each other little by little so as to penetrate the workpiece W. As the first and second rolling dies 100 and 101 are fed to penetrate the workpiece W in this way, the minor diameter of the workpiece W decreases. Therefore, the root circumferential length of the workpiece W becomes shorter at the time of completion of penetrating the first and second rolling dies 100 and 101 into the workpiece W than the root circumferential length at the time of initiating the penetrate operation. In other words, the relationship between the circumferential length of the workpiece W and the pitch differs between the time of initiation of the rolling process and the time of termination of the rolling process.

The circumferential length of the workpiece W shortens during the penetrate operation as follows. Assuming that the circumferential length at the time of initiating the penetrate feed operation is L and the lead angle (helix angle) of the worm is $\beta$ and constant, the circumferential length L has shortened geometrically by an amount corresponding to a reduction in the diameter upon completion of the penetrate feed operation. In the conventional rolling machine, however, the lead angle (helix angle) β of the cylindrical dies is invariable during the penetrate feed operation. Therefore, there is a pitch deviation δP between the pitch P of the workpiece W at the time of initiating the penetrate feed operation and the pitch P1 of the workpiece W at the time of termination of the penetrate feed operation.

During the rolling process, the workpiece W travels in the direction of its center axis by a distance corresponding to the pitch deviation δP. The phenomenon in which the workpiece W travels during the rolling process is known as "through-feed" of the workpiece W. The through-feed phenomenon occurs particularly remarkably in the case of a workpiece W such as a worm or a screw having large major and minor diameters. If through-feed occurs, the flank of the worm or the thread in the direction of movement of the workpiece W due to the through-feed strongly contacts the first and second rolling dies 100 and 101, which are cylindrical dies. As a result, the configuration accuracy, i.e. working accuracy, of the rolled component part is degraded.

The above-described first and second spindle tilting mechanisms are provided to prevent the occurrence of through-feed that exerts an influence upon the configuration accuracy of products such as a worm and a screw. That is, the first and second spindle tilting mechanisms correct the lead angle on the basis of the circumferential length of the workpiece during the penetrate feed operation. It should be noted that the lead angle of the workpiece being rolled is changed by the correction, but the change of the lead angle is only slight and hence has no significant effect on the configuration accuracy. The working error is less than in the case where the lead angle is not corrected, and falls within the tolerances satisfactorily.

[CNC System 120]

Figure 9:
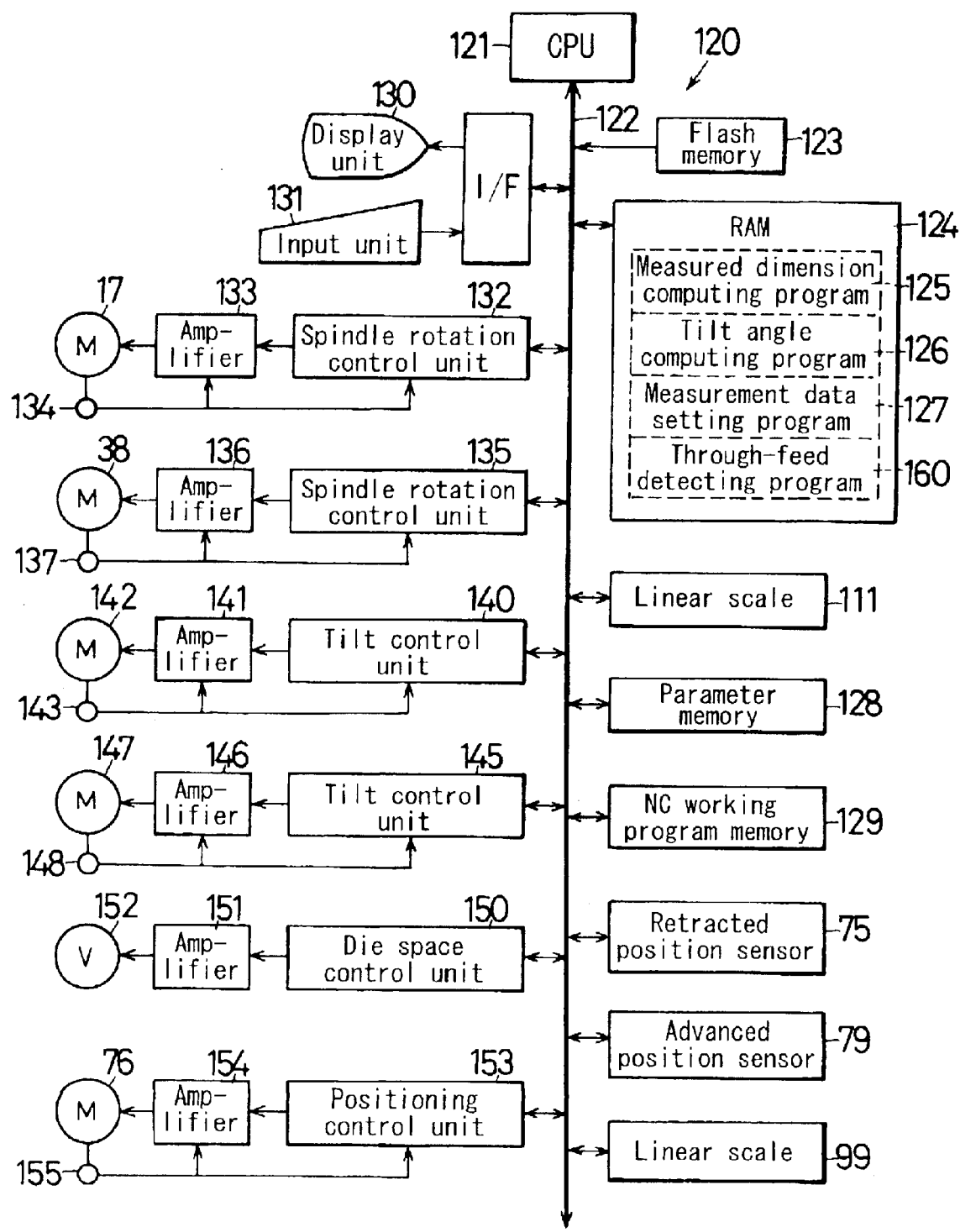
FIG. 9 is a block diagram showing the arrangement of a CNC system and motors for various control operations.
Figure 10:
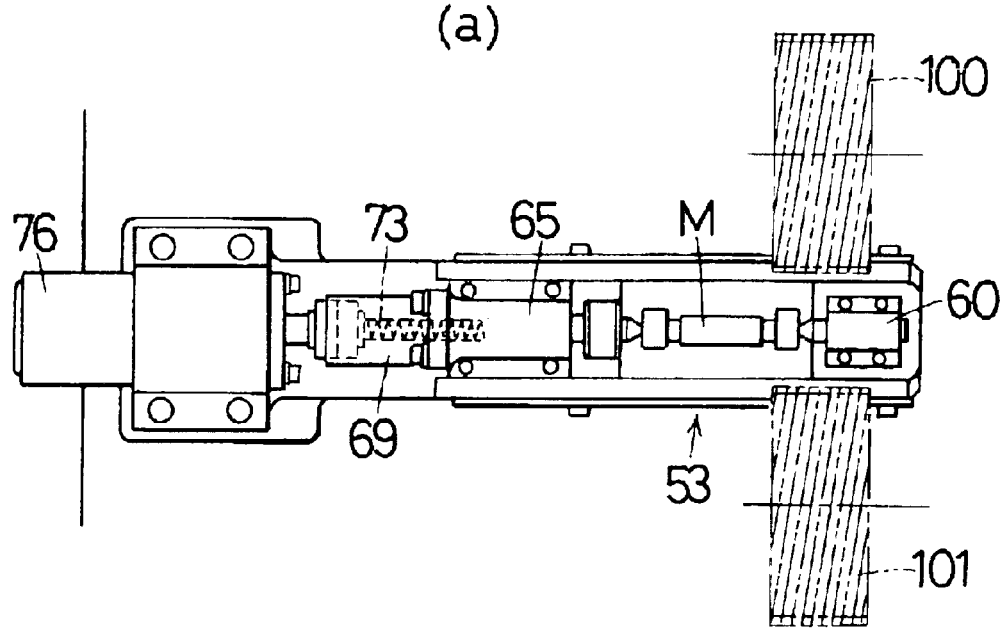
FIGS. 10(a) and 10(b) are diagrams showing the process sequence for forming a worm by rolling.
Figure 10:
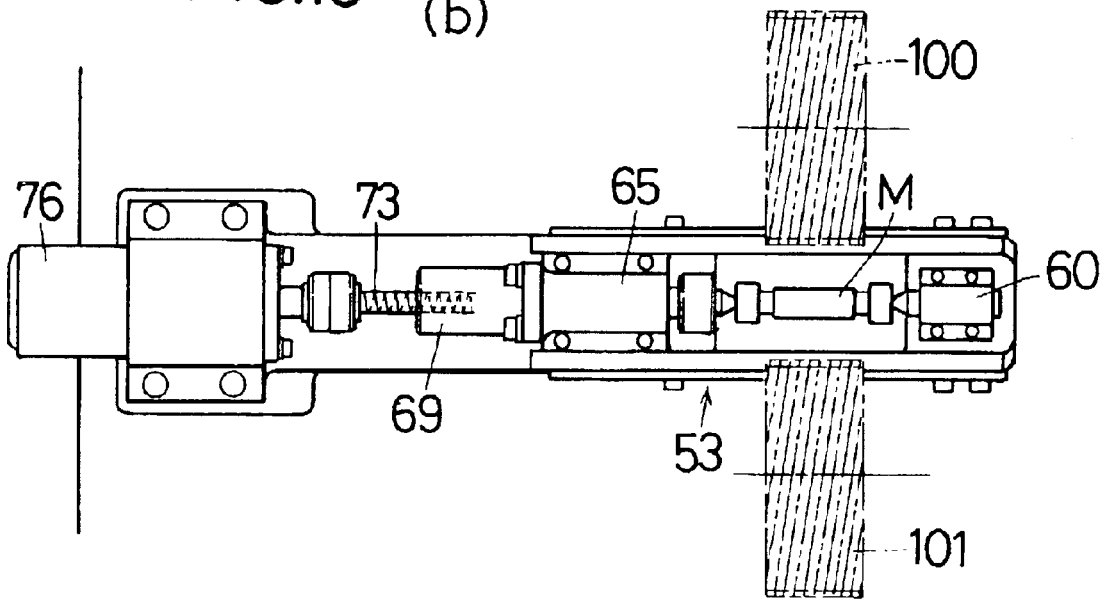
Figure 11:
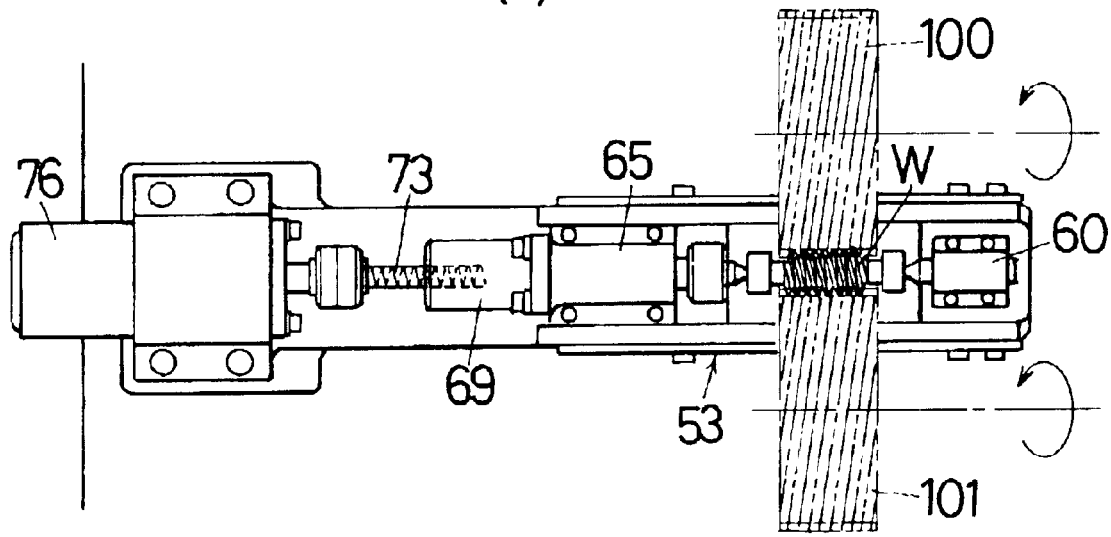
FIGS. 11(c) and 11(d) are diagrams showing the process sequence for forming a worm by rolling.
Figure 11:
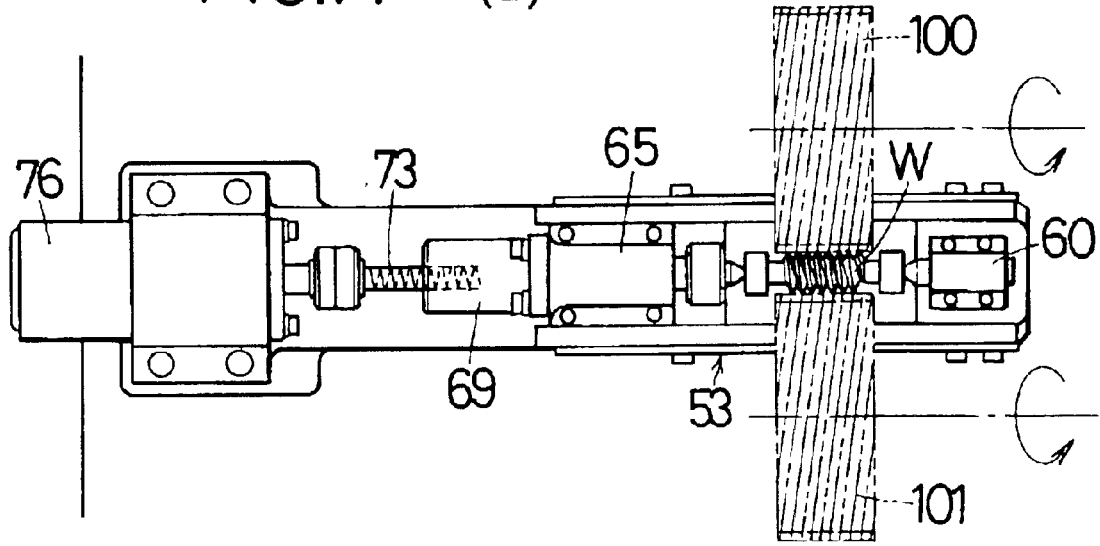
Figure 12:
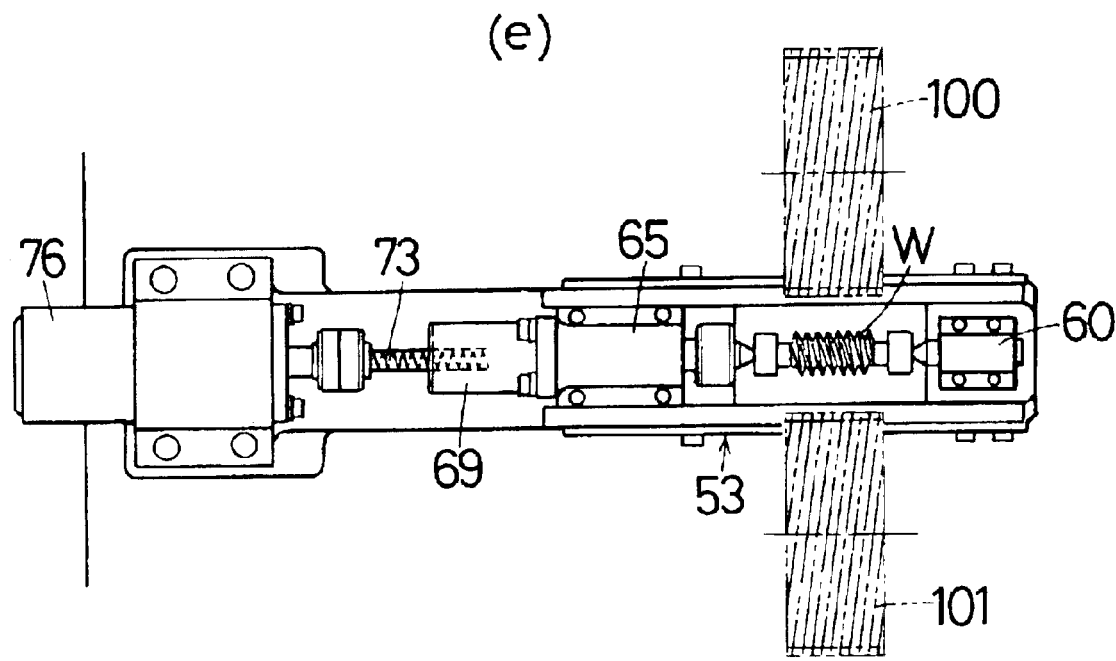
FIGS. 12(e) and 12(f) are diagrams showing the process sequence for forming a worm by rolling.
Figure 12:
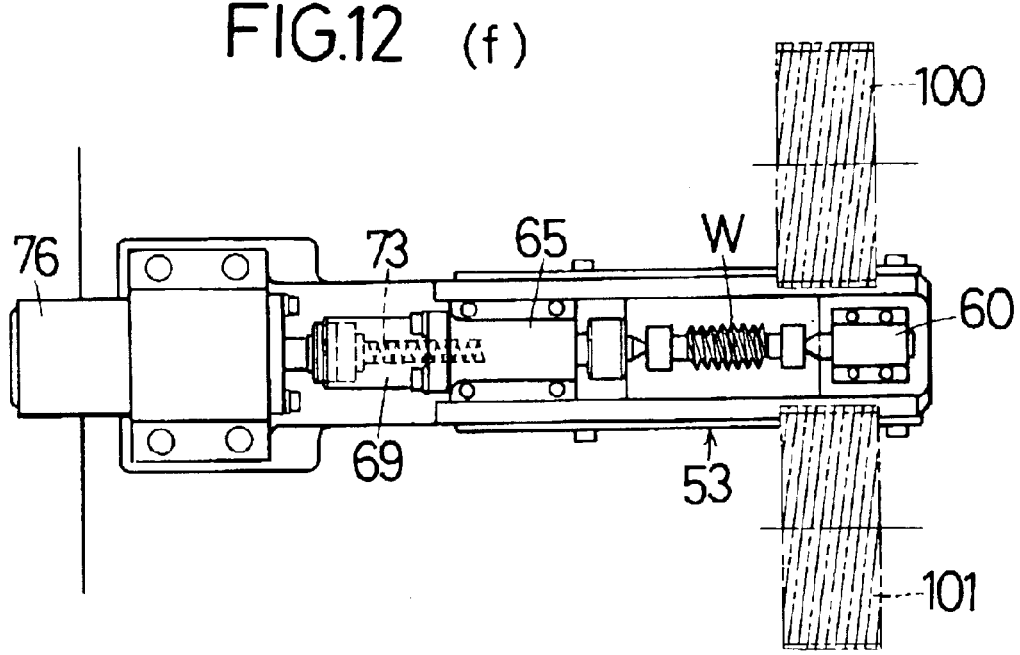

FIG. 9 is a block diagram showing the arrangement of the CNC system 120 and motors for various control operations. The CNC system 120 can use an NC special-purpose machine or a so-called personal computer NC system having a numerical control function and a personal computer function, which comprises a personal computer and an NC board or the like for performing servomotor control, sequence control, etc. that is installed in an expansion slot of the personal computer. The CNC system 120 is provided with a CPU 121 as an information processing means for performing various data processing. The CPU 121 is connected with a flash memory 123 as a main memory unit and a RAM 124 through a bus 122.

The CPU 121 operates according to a system program and data stored in the flash memory 123 and a program loaded (read) into the RAM 124, together with data read thereinto. Programs that may be loaded into the RAM 124 include an OS (Operating System) as a basic program, an NC command processing program for performing processing according to each of many NC commands, a tool-work data setting program, a measured dimension computing program 125, a tilt angle computing program 126, a measurement data setting program 127, a through-feed detecting program 160, and a display control program for displaying characters and figures on a display unit 130.

The measured dimension computing program 125 is for executing computing at every moment to determine the penetrate feed rate for rolling from the space between the first and second rolling dies 100 and 101, which is read from the linear scale 111 with the sensor, and data detected with the detectors 134, 137, etc. The result of the computation is given as a command to a die space control unit 150 by an NC working program in an NC working program memory 129 and thus executed.

The tilt angle computing program 126 is for computing the tilt angles of the first and second spindle tilting mechanisms at every moment from the amount of through-feed measured by the through-feed detecting program 160 and the space between the first and second rolling dies 100 and 101 measured by the measured dimension computing program 125. The result of the computation is given as a command to a tilt control unit 140 for the first spindle tilting mechanism and to a tilt control unit 145 for the second spindle tilting mechanism by the NC working program in the NC working program memory 129. The measurement data setting program 127 is for storing data for setting the dimensions of the first and second rolling dies 100 and 101, the dimension of the workpiece W, etc. into the memory.

The through-feed detecting program 160 is for measuring the amount of through-feed from data obtained by reading the linear scale 99. The CPU 121 is connected with a parameter memory 128 through the bus 122. The parameter memory 128 has previously been stored with various parameters necessary for the rolling process. If a non-volatile memory is used therefor, the parameter memory 128 can retain the memory contents even if the power supply of the CNC system 120 is turned off.

Further, the CPU 121 is connected with an NC working program memory 129 and so forth through the bus 122. The NC working program memory 129 has been stored with an NC working program for performing rolling by sequentially controlling the movement of the workpiece W to the working position or to the withdrawn position, the speed and amount of rotation of the first and second rolling dies 100 and 101 to roll the workpiece W, the tilt angle of the first and second spindle tilting mechanism, the space between the two dies, and so forth. The NC working program is prepared by the operator by programming the working conditions, the rotational speed, travel speed and feed rate of each die, etc. according to the kind, material and configuration of the workpiece W.

In addition, the CPU 121 is connected with input/output devices through the bus 122. As the input/output devices, a display unit 130 for displaying characters and figures and an input unit 131 for the operator to enter data are connected to the bus 122 through an interface circuit. As the display unit 130, a CRT, an EL display panel, a liquid crystal display, etc. can be used. As the input unit 131, a keyboard or a touch panel combined with the display unit 130 as one unit can be used.

Further, the CPU 121 may be connected with a fixed disk unit as an auxiliary storage unit through the bus 122. In such a case, the fixed disk unit has previously been stored with various programs or the like to be executed by the CPU 121, and as occasion demands, these programs or the like are appropriately loaded into the RAM 124 or the NC working program memory 129 from the fixed disk unit.

The CNC system 120 is connected to the servomotor 17 for rotationally driving the first rolling die 100 through a spindle rotation control unit 132 for the first rolling die 100 and further through an amplifier 133. The rotational speed of the servomotor 17 is fed back to the amplifier 133 through the detector 134 to maintain a predetermined rotational speed. Accordingly, the angle position of the first rolling die 100 about the axis thereof is fed back to the spindle rotation control unit 132 from the detector 134, thereby allowing the first rolling die 100 to be controlled at a desired rotation speed and a desired angle position.

Similarly, the CNC system 120 is connected to the servomotor 38 for rotationally driving the first rolling die 100 through a rotation control unit 135 for the second rolling die 101 and further through an amplifier 136. The rotational speed of the servomotor 38 is fed back to the amplifier 136 through the detector 137 to control the servomotor 38 at a predetermined rotational speed. Accordingly, the angle position of the second rolling die 101 about the axis thereof is fed back to the spindle rotation control unit 132 from the detector 137, thereby allowing the second rolling die 101 to be controlled at a desired rotation speed and a desired angle position.

Further, the CNC system 120 is connected to a servomotor 142 of the first spindle tilting mechanism for tilting the first rolling die 100 and also connected to a servomotor 147 of the second spindle tilting mechanism for tilting the second rolling die 101 to control the servomotors 142 and 147. More specifically, the CNC system 120 is connected to the servomotor 142 for controlling the pivoting of the first rolling die 100 through a tilt control unit 140 for the first rolling die 100 and further through an amplifier 141. The rotation of the servomotor 142 is fed back to the amplifier 141 through a detector 143 to maintain a predetermined tilt angle. Accordingly, the pivot angle position for tilting the first rolling die 100 is fed back to the tilt control unit 140 from the detector 143. Thus, the first rolling die 100 can be positioned at a desired pivot angle position for tilting it.

Similarly, the CNC system 120 is connected to the servomotor 147 for controlling the pivot angle position for tilting the second rolling die 101 through a tilt control unit 145 for the second rolling die 101 and further through an amplifier 146. The rotation of the servomotor 147 is fed back to the amplifier 146 through a detector 148 to control the second rolling die 101 at a predetermined tilt angle. Accordingly, the pivot angle position of the second rolling die 101 is fed back to the tilt control unit 145 from the detector 148. Thus, the second rolling die 101 can be positioned at a desired pivot angle position for tilting it.

Further, the CNC system 120 controls the space between the first and second rolling dies 100 and 101 by on-off controlling the valve opening and closing operation of a servovalve 152 of the hydraulic cylinder 50. For this purpose, the CNC system 120 is connected to the servovalve 152 for controlling the hydraulic cylinder 50 through a die space control unit 150 and an amplifier 151. In this example, the positioning accuracy of the system is of the order of 4 to 5 $\mu$m under a load of 100 KN.

The CNC system 120 is connected to the servomotor 76 for controlling the position of the workpiece W through a positioning control unit 153 of the work feed apparatus 59 and further through an amplifier 154. The rotation of the servomotor 76 is fed back to the amplifier 154 through a detector 155, and thus the workpiece W is fed to a predetermined rolling initiation position. The retracted position detecting sensor 75 is for sensing the most retracted position of the workpiece W during the rolling process. The advanced position detecting sensor 79 is for sensing the most advanced position of the workpiece W during the rolling process. The above-described driving shafts are controlled independently of each other except the synchronous rotation of the first and second rolling dies 100 and 101. It should be noted, however, that the driving shafts may be controlled synchronously when the system has control capability to spare for the synchronous control.

The tailstock 60 has the linear scale 99 disposed on a side thereof, as has been stated above. The through-feed detecting program 160 is for computing the amount of through-feed after the initiation of rolling process by reading the linear scale 99. The through-feed detecting program 160 computes the amount of through-feed of the workpiece W after the initiation of rolling process in a state where the workpiece W is clamped between the tailstock 60 and the chuck plate 65.

[Worm Rolling Method 1]

Figure 8:
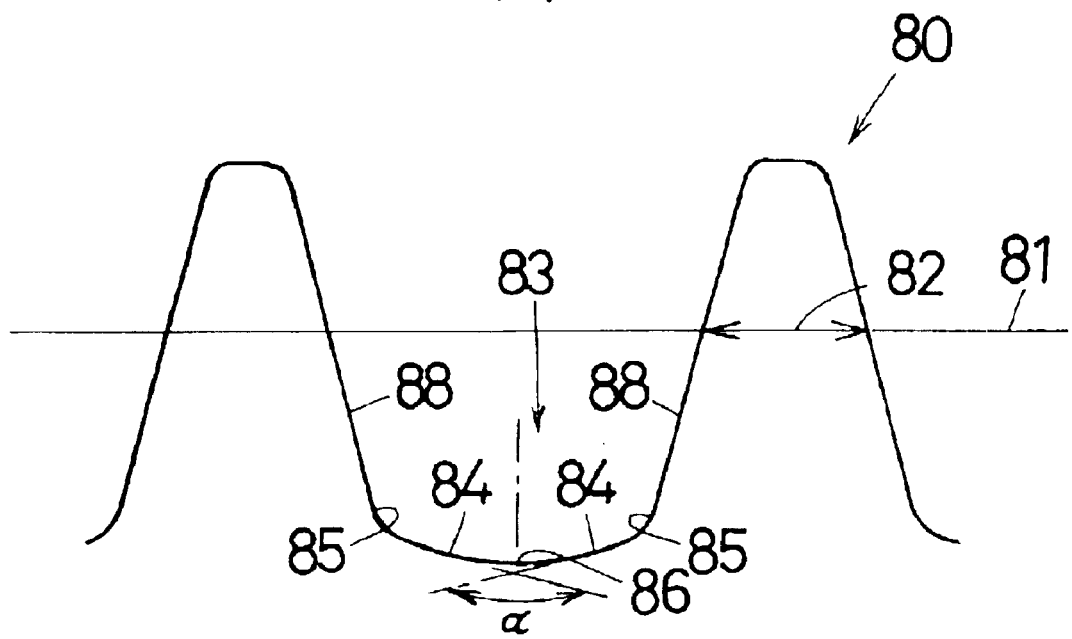
FIG. 8(a) is a sectional view of the tooth profile of a worm.
FIG. 8(b) is a sectional view of the tooth profile of another worm different in the tooth space configuration from that shown in FIG. 8(a).
Figure 8:
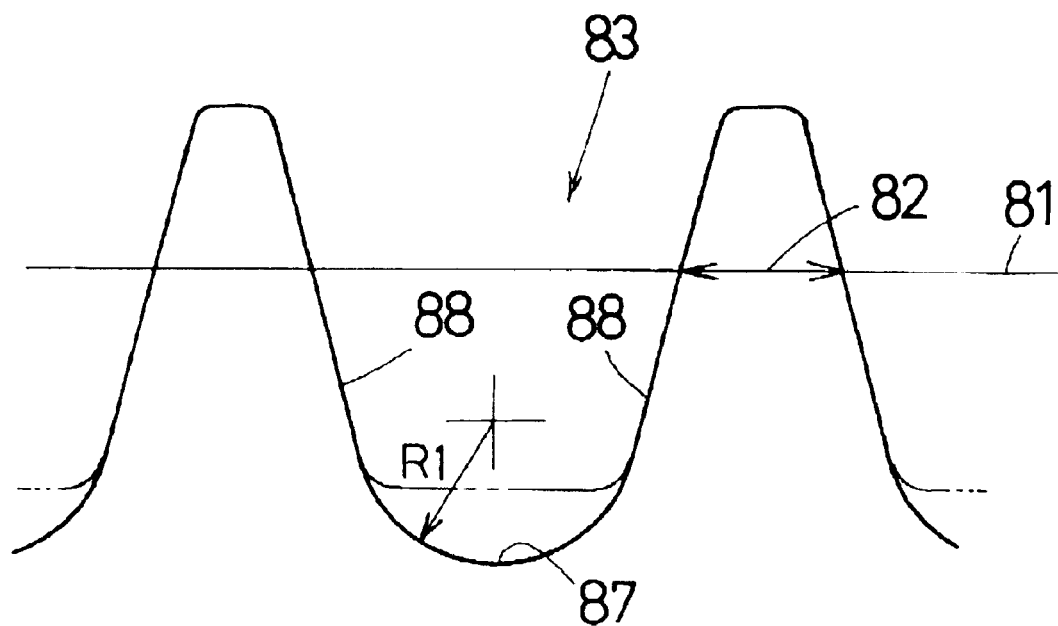

A method of forming a worm by rolling in the above-described rolling machine 1 and with the work feed apparatus will be described with regard to a worm used in a worm gear mechanism for assisting an electric power steering system for a vehicle, by way of example. FIG. 8(*a*) is a sectional view of the tooth profile of a worm as taken along a plane containing the center line of the worm. The worm 80 is formed so that the tooth thickness 82 is smaller than the tooth space 83 in comparison to ordinary worms, as viewed at a circumferential position in a section 81 containing the pitch line.

The reason for this is to increase the tooth thickness of a worm wheel (not shown) that meshes with the worm 80 because the worm wheel is made of a synthetic resin and hence weak in mechanical strength. The tooth bottom is formed with an angle $\alpha$ so that two helical slant surfaces 84 intersect each other as viewed in a section. In this example, the angle $\alpha$ is 150 degrees. In the worm rolling method according to the present invention, the angle $\alpha$ is preferably in the range of from 120 to 150 degrees from the viewpoint of smoothing the plastic flow of material, provided that carbon steel for mechanical structure (e.g. S45C) is used in the manufacture of a worm having a pitch circle of 18 to 20 mm and a module of 1.5 to 2.0 and in which the number of threads is 2 or 3. It is also preferable that the tooth depth should be not more than 6 mm and the minor diameter should be not less than 10 mm. If the dimensions are not within these numerical value ranges, such a phenomenon that the material separates from the surface may occur.

The two slant surfaces 84 intersect each other with the angle $\alpha$ in the middle of the bottom. Thus, the middle of the bottom has the smallest diameter. The tooth surface 88 and each slant surface 84 are connected to each other through a curved surface 85. The two slant surfaces 84, i.e. conical surfaces, are also connected through a curved surface 86. The curved surface 86 of the worm of the above-described specifications should preferably have a radius of 1.0 to 1.5 mm as viewed in a section from the viewpoint of smoothing the plastic flow of material. The bottom has a tapered convex configuration as viewed from the tool side, which allows the material to plastically flow easily and uniformly. Accordingly, rolling can be effected smoothly. More specifically, the bottom has a configuration in which two slant surfaces 84, which are conical surfaces, intersect each other. In other words, the bottom has an angular tip. Therefore, the metal is distributed along both sides of the angular tip, thus allowing the material to plastically flow easily and uniformly.

FIG. 8(*b*) is a sectional view of the tooth profile of another worm different in the tooth space configuration from that shown in FIG. 8 (*a*). The bottom 87 of the tooth space 83 shown in FIG. 8(*b*) has a configuration defined by a circular arc with a radius R1 as viewed in a section. The bottom 87 shown in FIG. 8(*b*) has an arcuate configuration, i.e. a convexly arcuate configuration as viewed from the rolling die side. Therefore, the worm shown in FIG. 8(*b*) has the advantage that the material can plastically flow easily and naturally in comparison to the bottom configuration shown in FIG. 8(*a*). In the case of carbon steel for mechanical structure, the radius R1 of the bottom 87 should preferably be in the range of from 1.0 to 1.5 mm as viewed in a section from the viewpoint of smoothing the plastic flow of material.

FIGS. 10(a) to 12(f) show the process sequence for forming a worm by rolling. When a solid cylindrical blank material M as a workpiece W is placed in a chucking position, the pneumatic chucking cylinder 69 is activated to hold the material M between the center 62 and the live center 66. During the suspension of rotation of the first and second rolling dies 100 and 101, the servomotor 76 is started to rotate the feed screw 73, thereby driving the slide plate 55 to feed the material M toward the first and second rolling dies 100 and 101 [see FIG. 10(a)] and further to the rolling initiation position [see FIG. 10(b)].

The first and second rolling dies 100 and 101 have been set in predetermined positions, respectively. The first and second rolling dies 100 and 101 are started to rotate in the same direction synchronously with each other. While the first and second rolling dies 100 and 101 are rotating synchronously, the hydraulic cylinder 50 is driven to penetrate-feed the dies 100 and 101 toward each other. With this penetrate feed operation, rolling is initiated.

In the rolling process, if the lead angle (usually the lead angle at the pitch point) of the worm to be manufactured is large and the difference between the finished diameter and the blank diameter is large, the lead angle changes during the progress of rolling between the rolling initiation position and the rolling termination position, resulting in an error. This error is the above-described through-feed. When the rolling process is initiated, the through-feed occurs, causing the slide plate 55 to move. The slide plate 55 is freely slidable on the slide 53. Therefore, even if the rotation of the first rolling die 100 and that of the second rolling die 101 are controlled strictly so as to be synchronous with each other, because the lead angle of each of the first and second rolling dies 100 and 101 is fixed, the workpiece W that is being rolled travels in the axial direction by a distance corresponding to the lead angle of the worm and the amount of movement corresponding to the number of revolutions of the first and second rolling dies 100 and 101, i.e. by a distance corresponding to the amount of through-feed.

When the slide plate 55 has been fed by a predetermined amount owing to the through-feed as the rolling process progresses, the sensor dog 63 is detected by the advanced position detecting sensor 79. Alternatively, the detection of the advanced position of the workpiece W due to the through-feed may be effected by using the linear scale 99. When this is detected, the first and second rolling dies 100 and 101 stop rotating, and the penetrate feed operation by the hydraulic cylinder 50 is stopped. Further, the first and second rolling dies 100 and 101 retract away from each other in the opposite directions to the penetrate feed directions. In this example, the first and second rolling dies 100 and 101 are retracted through a distance of the order of about 0.05 to 0.2 mm, i.e. retracted to such an extent that the plunging pressure for rolling is removed, thereby releasing the material M.

The retracting operation is carried out to release the elastic deformation of the material M and the elastic deformation of the mechanical system of the rolling machine, thereby preventing the first and second rolling dies 100 and 101 from contacting the material M (the retracting operation will hereinafter occasionally be referred to as "springback"). Thereafter, the first and second rolling dies 100 and 101 are fed again to the rolling position (penetrate operation), and reverse rotation is started [see FIG. 11(d)]. The penetrate feed operation (penetrate operation) employs a method wherein penetrate feed is effected while being varied stepwisely in 5 to 30 steps in the case of the worm of the above-described specifications. If necessary, a dowel process (described later) is performed intermittently at any step of the rolling process, as will be described later.

The rolling process effected by the reverse rotation also allows correction of a working error due to through-feed. The detailed mechanism of the error correcting principle is unclear. It is presumed, however, that the error is corrected because the contact between the workpiece W and the dies is made uniform. This rolling process causes the workpiece W to travel in an axial direction opposite to the axial direction in which the workpiece W travels during the first-described rolling process, in accordance with the lead of the first and second rolling dies 100 and 101. Then, the sensor dog 71 is sensed by the retracted position detecting sensor 75. Alternatively, the detection of the retracted position of the workpiece W due to the through-feed may be effected by using the linear scale 99.

Next, the rotation of the first and second rolling dies 100 and 101 is stopped, and the hydraulic cylinder 50 is driven to separate the first and second rolling dies 100 and 101 from the workpiece W and to retract them to the respective withdrawn positions [see FIG. 12(e)]. The servomotor 76 is started to rotate the feed screw 73 reversely, thereby driving the slide 53 to feed the workpiece W away from the first and second rolling dies 100 and 101 to the previous working initiation position [see FIG. 10(f)]. Thereafter, the same process is repeated to perform rolling. In the case of a worm of the above-described specifications, the rolling process is repeated 15 to 50 times in terms of the number of times of forward/reverse rotation with the first and second rolling dies 100 and 101 rotated at a speed of 10 to 40 rev/min.

When the first and second rolling dies 100 and 101 initiate rolling of the material M, the contact of the dies 100 and 101 with the material M is not uniform at all the outer peripheral positions of the material M. That is, a worm is usually formed with two or three threads, and the number of combinations of teeth of the first and second rolling dies 100 and 101 that mesh simultaneously with the teeth of the worm differs according to the angle position of the outer periphery. In other words, because the first and second rolling dies 100 and 101 press against the outer periphery of the material M with a fixed force, the plastic flow differs according to the angle position of the outer periphery. Consequently, in the case of a worm with two threads, the sectional configuration is likely to become elliptical. In the case of a worm with three threads, the sectional configuration is likely to become substantially triangular.

To correct the undesired configuration, rolling is performed 2 to 5 times in terms of the number of times of forward/reverse rotation in a state where the penetrate feed operation (feed operation) effected by the hydraulic cylinder 50 is stopped to suspend the penetrate operation by the first and second rolling dies 100 and 101 approaching each other (i.e. dowel step). By doing so, the pitch cylinder and the cylinder defining the major diameter, which would otherwise be likely to become elliptical or substantially triangular in sectional configuration as stated above, is rolled to a round configuration. If the dowel step is not carried out, the worm of the above-described specifications is formed into an irregular shape with a working error of 0.2 to 0.3 mm in terms of the pitch cylinder diameter or the major diameter. With the above-described rolling method, the worm of the above-described specifications was capable of being rolled with a working error within 0.02 mm. The dowel operation, which is carried out 2 to 3 times, is performed intermittently at any step of the penetrate feed operation (penetrate operation) during the rolling process.

[Worm Rolling Method 2]

In the above-described worm rolling method 1, the correction of an error due to the through-feed of the workpiece W is made by reversely rotating the first and second rolling dies 100 and 101. According to the worm rolling method 2, however, the tilt of the first and second rolling dies 100 and 101 is controlled by controlling the servomotors 142 and 147 according to the result of the computation executed by the tilt angle computing program 126, thereby correcting the through-feed. Thus, it is possible to adopt a method whereby rolling is progressed while effecting control so that through-feed will not occur, or the amount of through-feed will be less than a predetermined value.

FIELD OF INDUSTRIAL APPLICATION

The present invention is not limited to the above-described worm for use in an electric power steering system for an automobile and to the method of forming the worm by rolling, but may be applied to a metallic worm for power transmission that may be used for other industrial machines and consumer machines and also applied to a method of forming the worm by rolling.

What is claimed is:

1. A worm rolling method comprising:
    a step of providing a rolling machine comprising:
        a plurality of cylindrical dies for rolling a cylindrical blank placed in a center between said dies;
        a die rotationally driving means for rotationally driving said dies;
        a blank supporting means for rotatably supporting said blank; and
        a penetrate feed means for penetrate-feeding said dies toward each other;
    a first step of rolling said blank by penetrate-feeding said dies toward said blank while synchronously rotating said dies in a same direction; and
    a second step of rolling said blank with said dies by reversing the direction of rotation of said dies after termination of said first step, wherein said first step and said second step are alternatively repeated to form a worm;
    wherein through-feed, which is axial travel of said worm due to a change in a lead angle of said worm caused by a change in a diameter of said blank during said rolling, is detected from travel of said blank, and when said travel has exceeded a set range, the direction of rotation of said dies is reversed to reverse a direction of said through-feed.

2. A worm rolling method comprising:
    a step of providing a rolling machine comprising:
        a plurality of cylindrical dies for rolling a cylindrical blank placed in a center between said dies;
        a die rotationally driving means for rotationally driving said dies;
        a blank supporting means for rotatably supporting said blank; and
        a penetrate feed means for penetrate-feeding said dies toward each other;
    a first step of rolling said blank by penetrate-feeding said dies toward said blank while synchronously rotating said dies in a same direction; and
    a second step of rolling said blank with said dies by reversing the direction of rotation of said dies after termination of said first step, wherein said first step and said second step are alternatively repeated to form a worm;
    wherein said rolling machine has spindle tilting means for pivoting said dies about an axis perpendicular to the axes of rotation of said dies, and
    wherein through-feed, which is axial travel of said blank due to a change in a lead angle caused by a change in a diameter of said blank during said rolling, is detected, and a correction pivot angle of said spindle tilting means is computed to cancel the through-feed, and then, said dies are pivoted by said spindle tilting means by an amount corresponding to said correction pivot angle to cancel said through-feed.

3. A worm rolling method according to claim 1 or 2, wherein said second step is carried out after said dies have been withdrawn in opposite directions to directions of penetrate feed by said penetrate feed means.

4. A worm rolling method according to claim 1 or 2, wherein said worm is formed by alternately carrying out said first step and second step in a state where said penetrate feed of said dies is suspended.

5. A worm rolling method according to claim 1 or 2, wherein said dies of said rolling machine comprise two dies disposed approximately in a center between four guides such that axes of rotation of said dies are parallel to each other.

6. A worm formed by a worm rolling method using a rolling machine, said rolling machine having:
    a plurality of cylindrical dies for rolling a cylindrical blank placed in a center between said dies;
    die rotationally driving means for rotationally driving said dies synchronously with each other;
    blank supporting means for rotatably supporting said blank; and
    penetrate feed means for penetrate-feeding said dies toward each other;
    wherein the rolling machine is operated to roll said blank by penetrate-feeding said dies toward said blank while synchronously rotating said dies in a same direction; and then to roll said blank with said dies by reversing the direction of rotation of said dies, so as to form a worm,
    wherein a bottom between teeth of said worm has a configuration in which two slant surfaces, which are conical surfaces, intersect each other as viewed in a section containing an axis of said worm.

7. A worm formed by a worm rolling method using a rolling machine, said rolling machine having:
    a plurality of cylindrical dies for rolling a cylindrical blank placed in a center between said dies;
    a die rotationally driving means for rotationally driving said dies synchronously with each other;
    a blank supporting means for rotatably supporting said blank; and
    a penetrate feed means for penetrate-feeding said dies toward each other;

wherein the rolling machine is operated to roll said blank by penetrate-feeding said dies toward said blank while synchronously rotating said dies in a same direction; and then to roll said blank with said dies by reversing the direction of rotation of said dies, so as to form a worm, wherein a bottom between teeth of said worm has a configuration defined by a circular arc with a radius as viewed in a section containing an axis of said worm.

8. A worm according to claim 6 or 7, wherein said dies of said rolling machine comprise two dies disposed approximately in a center between four guides such that axes of rotation of said dies are parallel to each other.

9. A worm according to claim 6 or 7, wherein said rolling machine has spindle tilting means for pivoting said dies about an axis perpendicular to axes of rotation of said dies.

10. A worm according to claim 6 or 7, wherein a tooth thickness of said worm is smaller than a tooth space thereof as viewed in a section containing the axis of said worm.

* * * * *